Nov. 10, 1931.       C. P. EISENHAUER       1,831,656
WATER SOFTENER
Filed Dec. 27, 1927       4 Sheets-Sheet 1

INVENTOR
CHARLES P. EISENHAUER
BY Toulmin Toulmin,
ATTORNEYS

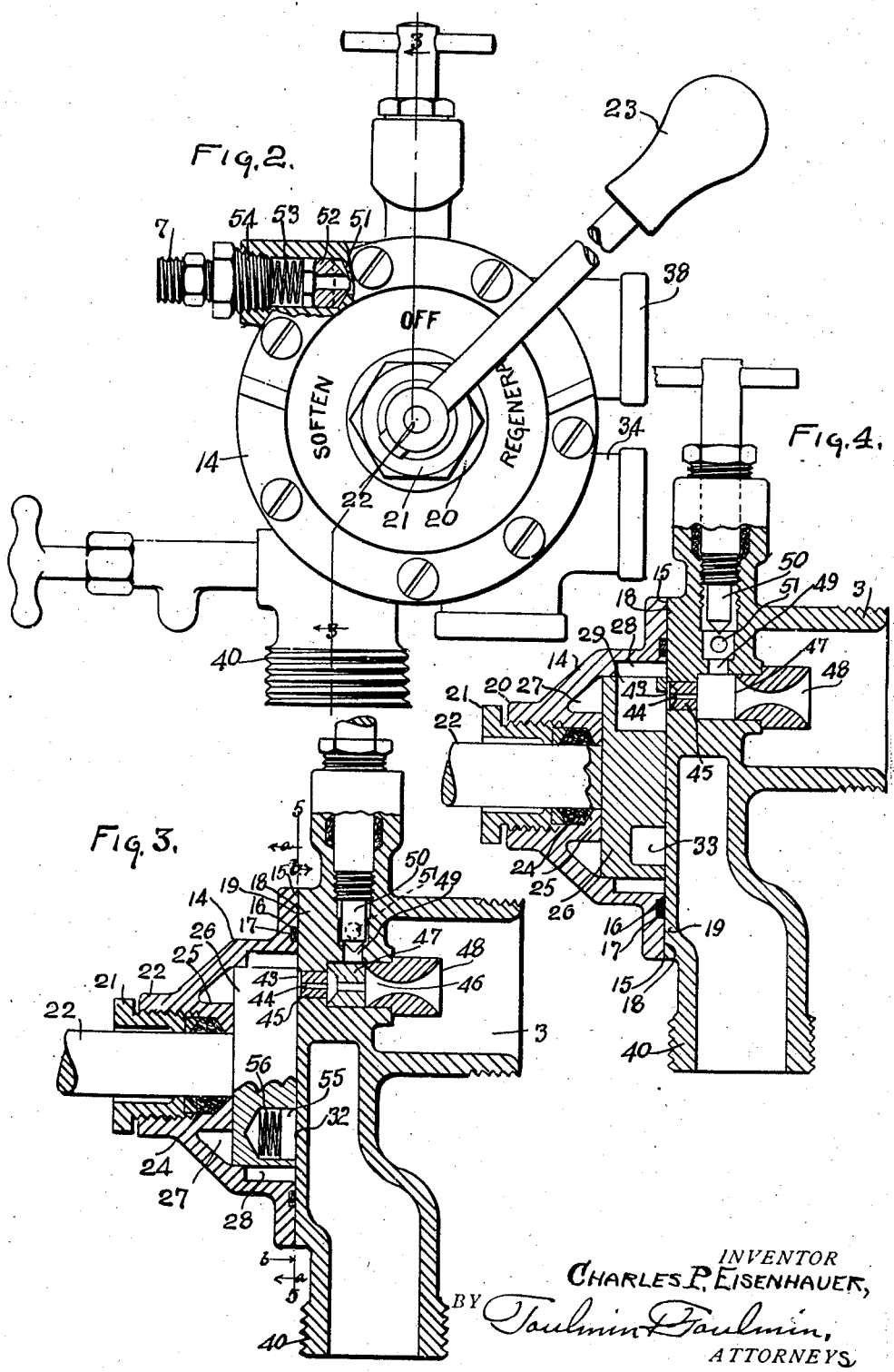

Nov. 10, 1931. C. P. EISENHAUER 1,831,656
WATER SOFTENER
Filed Dec. 27, 1927 4 Sheets-Sheet 3
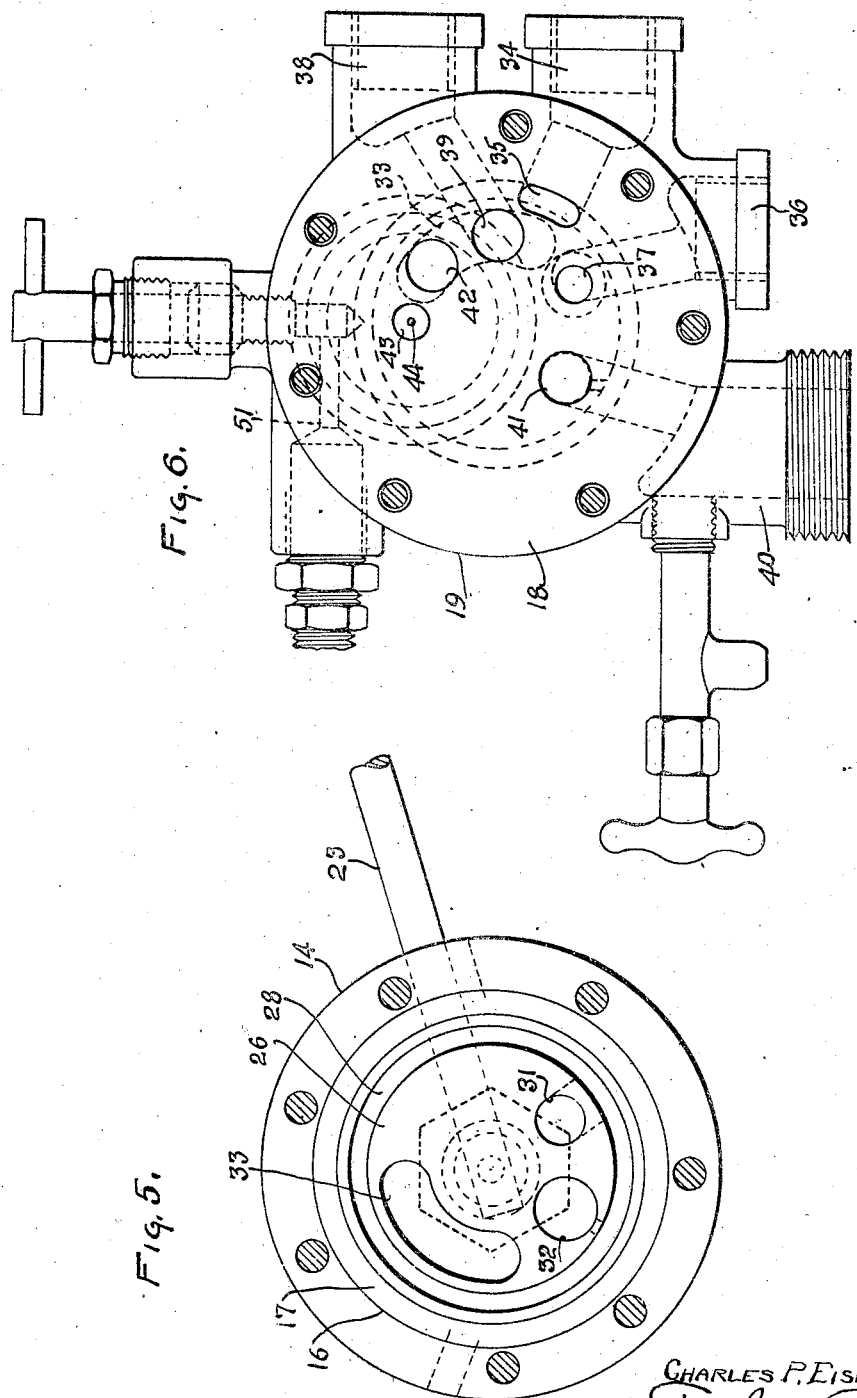

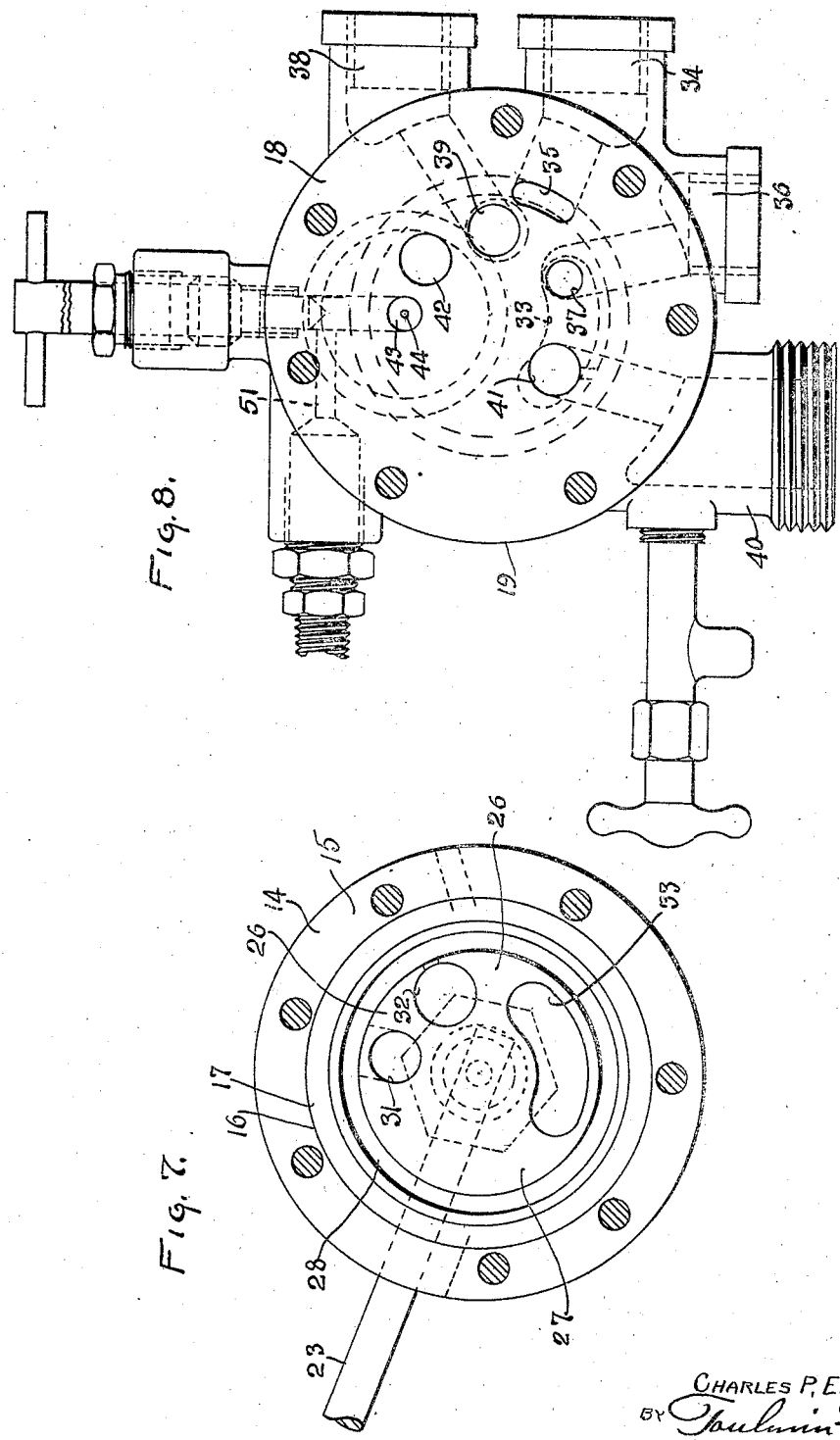

Patented Nov. 10, 1931

1,831,656

UNITED STATES PATENT OFFICE

CHARLES P. EISENHAUER, OF DAYTON, OHIO, ASSIGNOR TO THE DURO COMPANY, OF DAYTON, OHIO, A CORPORATION OF OHIO

WATER SOFTENER

Application filed December 27, 1927. Serial No. 242,570.

My invention relates to water softeners.

It is the object of my invention to provide a water softener, and in particular a master control valve therefor in which a single handle moved to two positions will adjust the mechanism for softening, regenerating and washing in combination with the adjustment of the needle valve for controlling the salt flow and replenishment of the salt tank with fresh water.

It is my object to secure the maximum of advantage of the simplicity of a hand-operated system with the minimum of the complication of such a system.

Heretofore it has been necessary, in hand-operated softeners, to add salt at each regeneration; this is eliminated by the present invention. In the present invention salt is placed in a tank with water and a brine is made which is sufficient for a large number of regenerations. When it is desired to regenerate, the handle is placed in regenerating position and the brine valve is opened. The flow of brine is permitted to continue until the indicating point on the salt float descends to a predetermined place, at which time the brine valve is closed. The main valve remains in regenerating position until the fresh water passing through the softener has washed out the brine through the softening material. The handle is then turned to softening position and the brine valve opened so that water may flow into the brine tank to replenish the brine tank with water to lift the float to its initial position, and when it accomplishes the initial position the brine valve is closed and the softening operation is ready to start.

Thus, with two valves, movable only to two positions, the main objections of a multiplicity of valves, the difficulty of operating the valves in proper sequence and with proper timing, and the necessity for replenishing with salt at each regeneration, are eliminated. Thus the principal objections to a hand-operated softener are disposed of.

Referring to the drawings:

Figure 2 is a front elevation, partially in section, of the control valves.

Figure 3 is a section on the line 3—3 of Figure 2, showing the parts of the valve in softening position.

Figure 4 is a view similar to Figure 3, showing the parts of the valves in regenerating position.

Figure 5 is a section on the line 5—5 of Figure 3, looking in the direction of the arrows $a$, showing a front elevation of the valve rotor in softening position.

Figure 6 is a section along the line 5—5 of Figure 3, looking in the direction of the arrows $b$, at the face of the stationary or stator portion of the valve.

Figure 7 is a view similar to Figure 5, showing the rotor in regenerating position.

Figure 8 is a view similar to Figure 6, showing by dotted lines the position of the ports of the rotor when the parts are in regenerating position.

Figure 1:
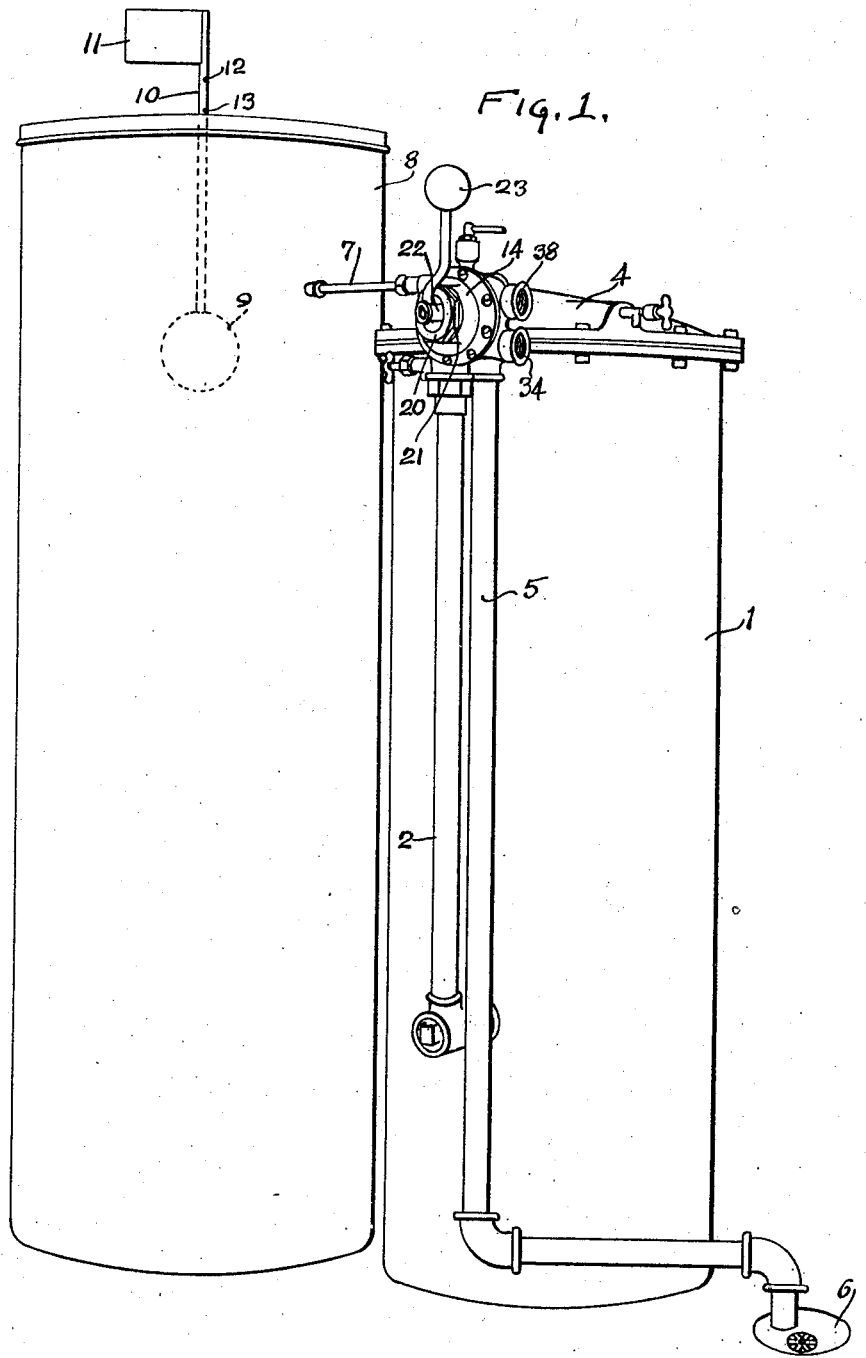
Figure 1 is a perspective of the entire system.

Referring to the drawings in detail, 1 is a tank known as a softening tank, having a body of softening mineral therein of the usual character. The bottom of the body of softening material has a supply pipe 2, while a top pipe is attached to the pipe 3 of the valve housing communicating with the top of the softening tank, which top is generally designated 4. 5 designates the drain line, which empties into the drain 6; 7 indicates the brine line communicating with the brine tank 8, in which is located a float 9 carrying a float rod 10, a flag 11 and indicating notches 12 and 13.

The valve structure consists of a rotor 14, which is so formed as to provide a flat engaging surface 15, that is provided with a gasket groove 16 and a gasket 17 engaging with the corresponding flat face 18 of the valve casing or stator 19. This rotor casing 14 is provided with a sleeve portion 20, in which is mounted a threaded member 21 thru which a shaft 22, carrying a handle 23 projects. The threaded sleeve 21 maintains a packing 24 in position against an internal sleeve 25, which is an integral part of the casing 14 of the rotor, and which also serves as a support for the shaft 22 and the head 26 mounted on the shaft 22. This head 26 abuts against the end of the sleeve 25 and forms with the sleeve 25 and the casing 14 an annular passageway 28, in which the water pressure may accumulate and thereby force the head 26 and its engaging face 27 against the corresponding engaging face 18 of the stator 19.

An annular chamber 28 is formed around this head 26 to form a passageway or groove for the passage of fluid which is adapted to enter lateral ports 29 and 30, which communicate with face ports 31 and 32 in the face of the head 26. The face of the head 26 is further provided with an arcuate recess or groove 33, but this groove is not in communication with the chamber 28.

Turning to the stator, it will be observed that it is provided with a hard water inlet passageway 34, which makes its exit through the port 35 in the face 18. It is provided with a drain line 36, which communicates with the face 18 of the stator through the port 37. It is provided with an outlet to the service line passageway 38, which has a port 39 in the face 18 of the stator. It is provided with a passageway to the bottom of the softening tank, designated 40, having a port 41 in the face 18 of the stator. It is provided with a through passageway 42 through the stator from the face thereof into the pipe 3 leading to the top of the softener. It is provided with a port 43 leading from the face 18 of the stator into the pipe 3.

This port communicates by a passageway 44 with the pipe 3 and in the passageway is an injector nozzle 45 having a small aperture 46 which communicates with the chamber 47, that in turn communicates with the injector throat 48 projecting into the passageway 3. This chamber 47 has a lateral passageway 49 which serves as a seat for the closure valve, called salt needle valve 50, which controls the passageway 51 of the brine line 7. A spring-pressed hollow check valve 52 is mounted in this passageway 51 maintained in position by a spring 53 that is in turn held by a hollow screw plug 54 that forms a support for the pipe 7. The drain passageway 32 is provided with a rubber cover 55 held in position by the spring 56. The passageway through the hollow valve 52 permits the brine to pass with sufficient rapidity for regenerating purposes. After the brine has been withdrawn from the brine tank for regenerating purposes and the main valve is shifted to softening position, water is directed back into the brine tank. This valve is provided with a spring 53 which permits the valve to open so that a more rapid flow of water into the brine tank can be effected, so that it may rapidly refill the brine tank.

Method of operation

Assuming that the handle 23 is in softening position, the parts will be arranged as shown in section in Figure 3 and as shown in Figures 5 and 6.

Hard water will enter the passageway 34, thence out of the passageway 35 through the face 18 of the stator, thence into the groove 28 adjacent the rotor in the casing 14 and will pass through the passageway 29 through the port 31 in the face of the rotor head 26, into the port 41, passageway 40 to the bottom of the softening tank, thence up through the softening material into the pipe 3, passageway 42 into the groove 33 of the rotor 26 into the port 39 in the face 18 of the stator, through the passageway 38 to the house or service lines. At this time the salt needle valve 50 is closed, as shown in Figure 3.

The water pressure, which has leaked around behind the head 26, keeps it in sealed position. The water pressure from the groove 28 behind the rubber plug 55, together with the spring pressure of the spring 56 seals the drain opening 37 and drain passageway 36.

During the softening operation the float 9 is at its uppermost position with the notch 13 level with the top of the brine tank 8. If there is insufficient salt in the brine tank the flag 11 will descend to where the flag is too close to the top of the tank, which indicates the necessity for the replenishment of salt in the tank. Assuming that the salt is sufficient the float will stand so that the notch 13 is opposite the top of the tank 8.

When it is desired to regenerate the softening material in the tank 1, the handle 23 is moved to the regenerating position shown approximately in Figure 2, shown in section in Figure 4 and shown in elevation in Figures 7 and 8.

In such a position the incoming hard water through the passageway 34 and port 35 enters the groove 28 and passes into the port 29, port 31, through the minute injector nozzle 46, chamber 47, injector throat 48, pipe 3 into the top of the tank and downward through the mineral, drawing with it by suction the brine from the brine tank, which is permitted to enter the chamber 47 because the valve 50 has been lifted, opening the brine line. Water is also passing through the port 31 foreportioned to the brine to make a definite strength solution through the passageway 42. The brine and water pass out of the bottom of the tank, up through the pipe 2, through the passageway 40, port 41 into the groove 33, thence into the drain port 37, drain passageway 36 and out of the pipe 5 to the drain 6.

When the brine has descended to a position where the notch 12 is opposite the top of the tank, the operator knows that enough brine has passed through the softening tank. The operator then closes the salt valve and the continued flow of water without salt serves to wash out the softening material removing any trace of brine. When this has continued for a few minutes determined by test, he moves the handle 23 to softening position and opens the salt valve so that the water coming out of the top of the tank into pipe 3 will pass to the service line in softening condition, and a part of it will pass back through the brine line into the brine tank to replenish the tank with soft water to renew the level of the brine, and this will be permitted to continue until the shaft 10 of the float 9 has risen to a point where the notch 13 is even with the top of the tank 8. Then the salt valve is again closed.

I desire to comprehend within my invention such modifications as may be clearly embraced within my claims and the scope of my invention.

Having thus fully described my invention, what I claim is new and desire to secure by Letters Patent, is:

1. In a valve for water softening, a stator portion having a hard water inlet passageway and port, a service passageway and port, a drain passageway and port, a passageway to the bottom of a softening tank and port, a passageway and port communicating with the top of a softening tank, an injector passageway and port, an injector, a brine supply passageway communicating with the injector, a valve controlling said passageway, said ports communicating with the face of said stator, a rotor casing mounted on said stator, a rotor rotating therein having a face engaging the stator face, a groove in said face, a port in said face communicating with a lateral port in said rotor, a second port in said face having a lateral port in said rotor, a closure member yieldingly mounted in said second port of the rotor face, yielding means in the rotor for maintaining said member yieldingly in engagement with the stator face, a groove around said rotor between it and the rotor casing, an actuating shaft for the rotor mounted in said casing, said parts being so arranged that the hard water inlet port is connected by said groove to the port leading to the bottom of the softener and the port from the top of the softener is connected to the port leading to service when in softening position, and when in regenerating position the rotor groove in the face of the rotor connects the bottom of the softener and the drain, the groove between the rotor and its casing connects the hard water inlet and the top of the softener and the injector port while the port to service is sealed.

2. In a valve for water softening, a stator portion having a hard water inlet passageway and port, a service passageway and port, a drain passageway and port, a passageway to the bottom of a softening tank and port, a passageway and port communicating with the top of a softening tank, an injector passageway and port, an injector, a brine supply passageway communicating with the injector, a valve controlling said passageway, said ports communicating with the face of said stator, a rotor casing mounted on said stator, a rotor rotating therein having a face engaging the stator face, a groove in said face, a port in said face communicating with a lateral port in said rotor, a second port in said face having a lateral port in said rotor, a closure member yieldingly mounted in said second port of the rotor face, yielding means in the rotor for maintaining said member yieldingly in engagement with the stator face, a groove around said rotor between it and the rotor casing, an actuating shaft for the rotor mounted in said casing, said parts being so arranged that the hard water inlet port is connected by said groove to the port leading to the bottom of the softener and the port from the top of the softener is connected to the port leading to service when in softening position, and when in regenerating position the rotor groove in the face of the rotor connects the bottom of the softener and the drain, the groove between the rotor and its casing connects the hard water inlet and the top of the softener and the injector port while the port to service is sealed, and a pressure chamber behind said rotor communicating with the hard water inlet whereby the pressure will maintain the rotor in engaging position with the stator.

3. In a water softening control valve, a stator body having radially disposed hard water service drain, tank bottom, tank top and brine lines, a stator face having ports communicating with said lines and an ejector associated with the brine line and a tank top line, a needle valve controlling the brine line, said port from the stator face leading to the ejector being restricted, a rotor engaging the stator face, said rotor having a surface groove and two surface ports communicating with lateral ports therein, a rotor casing having a groove between it and the rotor, a yieldingly mounted sealing member in one of the face ports of the rotor adapted to seal the drain line in softening position and the service line in regenerating position.

4. In a water softening control valve, a stator body having radially disposed hard water service drain, tank bottom, tank top and brine lines, a stator face having ports communicating with said lines and an ejector associated with the brine line and a tank top line, a needle valve controlling the brine line, said port from the stator face leading to the ejector being restricted, a rotor engaging the stator face, said rotor having a surface groove and two surface ports communicating with lateral ports therein, a rotor casing having a groove between it and the rotor, a yieldingly mounted sealing member in one of the face ports of the rotor adapted to seal the drain line in softening position and the service line in regenerating position, and a yielding check valve in the brine line.

5. In a water softening valve, a ported stationary member having ports in the face thereof connected to a hard water line, a service line, a brine line, a drain line, a line to the top of the softening tank, a line to the bottom of the softening tank, an injector in the line leading to the top of the softening tank, said brine line and top line communicating with one another, a needle valve for controlling the brine line, a cup-shaped casing mounted over the face of said stator having said ports therein, and a rotatably mounted rotor having a face engaging with the stator face contained within said cup-shaped casing and supported thereby, separate but having two spaced face ports communicating with lateral ports and an arcuate faced groove, said casing being formed with a chamber behind said rotor communicating with the hard water inlet line which is under pressure, whereby the water pressure will serve to maintain the rotor in operative engagement with the stator face.

6. In a water softening valve, a ported stationary member having ports in the face thereof connected to a hard water line, a service line, a brine line, a drain line, a line to the top of the softening tank, a line to the bottom of the softening tank, an injector in the line leading to the top of the softening tank, said brine line and top line communicating with one another, a needle valve for controlling the brine line, a cup-shaped casing mounted over the face of said stator having said ports therein, and a rotatably mounted rotor having a face engaging with the stator face contained within said cup-shaped casing and supported thereby, separate but having two spaced face ports communicating with lateral ports and an arcuate faced groove, said casing being formed with a chamber behind said rotor communicating with the hard water inlet line which is under pressure, whereby the water pressure will serve to maintain the rotor in operative engagement with the stator face, said port adjacent to the brine line and the injector being restricted.

7. In a water softener, a softening tank, a brine tank, a valve mechanism consisting of a stator forming a casing and a rotor in said casing forming with the walls of the casing a circular waterway, a hard water inlet leading to said waterway, a drain line leading from said casing back of the rotor, a line leading from said casing back of the rotor to the bottom of the softening tank, a service line leading from said casing back of the rotor, a line leading from said casing to the top of said softening tank, the last named line having two openings to said casing, one a restricted opening having a chamber intermediate its ends, and a brine line from the brine tank to said chamber, said rotor having passageways therein which when the rotor is in one position directs the incoming hard water to the bottom and up through the softening tank and out at the service line and when the rotor is in another position, directs the hard water through the restricted opening to the top of and down through the softening tank and up out of the tank to and through the casing and out through the drain line.

8. In a water softener, a softening tank, a brine tank, a valve mechanism consisting of a stator forming a casing and a rotor in said casing forming with the walls of the casing a circular waterway, a hard water inlet leading to said waterway, a drain line leading from said casing back of the rotor, a line leading from said casing back of the rotor to the bottom of the softening tank, a service line leading from said casing back of the rotor, a line leading from said casing to the top of the softening tank, the last named line having two openings to said casing, one a restricted opening leading into an injector nozzle and a line from the brine tank to said restricted opening, said rotor having passageways therein which when the rotor is in one position directs the incoming hard water to the bottom and up through the softening tank and out at the service line and when the rotor is in another position directs the hard water through the restricted opening to force brine from the brine tank into and down through the softening tank, from the softening tank back through the casing and out through the drain line.

9. In a water softener, a softening tank, a brine tank, a valve mechanism consisting of a stator forming a casing and a rotor in said casing forming with the casing a waterway, a hard water inlet leading to said waterway, a drain line leading from said casing, a line leading from said casing to the bottom of the softening tank, a service line leading from said casing, a line leading from the casing to the top of the softening tank, the last named line having two openings to said casing, one a restricted opening leading into an injector nozzle and a line leading from the brine tank to said restricted opening, said rotor having passageways therein which, when the rotor is in one position, directs the incoming hard water to the bottom of and up through the softening tank and out at the service line, and when the rotor is in another position directs the hard water through the two openings into the upper end of the softening tank to draw brine from the brine tank and dilute the brine and force it down through the softening tank, from the softening tank back through the casing and out through the drain line.

In testimony whereof, I affix my signature.

CHARLES P. EISENHAUER.